United States Patent
Wang et al.

(10) Patent No.: US 12,071,561 B2
(45) Date of Patent: Aug. 27, 2024

(54) COATING COMPOSITIONS CURABLE AT LOW TEMPERATURES AND COATINGS FORMED THEREFROM

(71) Applicant: PPG Industries Ohio, Inc., Cleveland, OH (US)

(72) Inventors: Wei Wang, Allison Park, PA (US); David R. Fenn, Allison Park, PA (US); Paul H. Lamers, Allison Park, PA (US); Dennis L. Faler, North Huntingdon, PA (US); Leigh Ann Humbert, Pittsburgh, PA (US); Linlin Li, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 847 days.

(21) Appl. No.: 17/251,361

(22) PCT Filed: Jun. 11, 2019

(86) PCT No.: PCT/US2019/036529
§ 371 (c)(1),
(2) Date: Dec. 11, 2020

(87) PCT Pub. No.: WO2019/241234
PCT Pub. Date: Dec. 19, 2019

(65) Prior Publication Data
US 2021/0246331 A1    Aug. 12, 2021

Related U.S. Application Data

(60) Provisional application No. 62/683,311, filed on Jun. 11, 2018.

(51) Int. Cl.
*C09D 161/28*    (2006.01)
*B05D 7/00*    (2006.01)
(Continued)

(52) U.S. Cl.
CPC ........... *C09D 161/28* (2013.01); *B05D 7/576* (2013.01); *C09D 167/025* (2013.01); *C09D 175/12* (2013.01)

(58) Field of Classification Search
None
See application file for complete search history.

(56) References Cited

U.S. PATENT DOCUMENTS 5,370,910 A * 12/1994 Hille ............... C08G 18/4018
                                                           427/407.1
6,242,101 B1 * 6/2001 Schwalm ................ C09D 4/00
                                                           522/174

(Continued)

FOREIGN PATENT DOCUMENTS

| CN | 103328212 A | 9/2013 |
|---|---|---|
| EP | 3178864 A1 | 6/2017 |
| WO | 2017180220 A | 10/2017 |

*Primary Examiner* — Jeffrey D Washville

(57) ABSTRACT

A coating composition includes (a) a melamine resin having imino and methylol functional groups that together comprise 30 mole % or greater of the total functionality of the melamine resin; and (b) at least one polymer reactive with (a) that is obtained from components including polytetrahydrofuran and a carboxylic acid or anhydride thereof. The polytetrahydrofuran includes greater than 20 weight % of the components that form the polymer (b) and the carboxylic acid or anhydride thereof includes greater than 5 weight % of the components that form the polymer (b). The polymer (b) has an acid value of at least 15 based on the total resin solids of the polymer (b).

18 Claims, 1 Drawing Sheet

(51) Int. Cl.
*C09D 167/02* (2006.01)
*C09D 175/12* (2006.01)

(56) References Cited

U.S. PATENT DOCUMENTS

| | | |
|---|---|---|
| 2003/0149227 A1 | 8/2003 | Okazaki |
| 2013/0302582 A1 | 11/2013 | Matsunaga et al. |
| 2016/0347957 A1 | 12/2016 | Steinmetz et al. |
| 2017/0137666 A1 | 5/2017 | Steinmetz et al. |
| 2017/0158906 A1* | 6/2017 | Steinmetz .......... C09D 167/025 |
| 2017/0204289 A1* | 7/2017 | Kurtz .................. C08G 18/348 |

* cited by examiner

COATING COMPOSITIONS CURABLE AT LOW TEMPERATURES AND COATINGS FORMED THEREFROM

FIELD OF THE INVENTION

The present invention relates to coating compositions, coatings prepared with the coating compositions, and methods of preparing coatings.

BACKGROUND OF THE INVENTION

Coatings are applied to a wide variety of substrates to provide color and other visual effects, corrosion resistance, abrasion resistance, chemical resistance, and the like. In addition, various types of coatings, such as coatings applied to packaging and automotive substrates, can be formed from compositions that can be baked and formed at low cure temperatures. Because these compositions can be baked at low cure temperatures, they have been found useful in forming coatings at faster application times and with reduced costs. It is accordingly an objective of the present invention to provide coating compositions that can be dehydrated and cured at comparatively low temperatures to form coatings having various properties, thereby reducing costs and increasing efficiency of coating processes.

SUMMARY OF THE INVENTION

The present invention relates to a coating composition comprising: (a) a melamine resin comprising imino and methylol functional groups that together comprise 30 mole % or greater of the total functionality of the melamine resin; and (b) at least one polymer reactive with (a) that is obtained from components comprising polytetrahydrofuran and a carboxylic acid or anhydride thereof. The polytetrahydrofuran comprises greater than 20 weight % of the components that form the polymer (b) and the carboxylic acid or anhydride thereof comprises greater than 5 weight % of the components that form the polymer (b). The polymer (b) has an acid value of at least 15 based on the total resin solids of the polymer (b).

The present invention also related to a multi-layer coating system comprising: (1) a first basecoat layer applied over at least a portion of a substrate; and (2) a second basecoat layer applied over at least a portion of the first coating layer in which at least one of the first basecoat layer and the second basecoat layer is formed from a first basecoat composition comprising: (a) a melamine resin comprising imino and methylol functional groups that together comprise 30 mole % or greater of the total functionality of the melamine resin; and (b) at least one polymer reactive with (a) that is obtained from components comprising polytetrahydrofuran and a carboxylic acid or anhydride thereof. The polytetrahydrofuran comprises greater than 20 weight % of the components that form the polymer (b) and the carboxylic acid or anhydride thereof comprises greater than 5 weight % of the components that form the polymer (b). The polymer (b) has an acid value of at least 15 based on the total resin solids of the polymer (b).

Moreover, the present invention further relates to a process of coating a substrate with a multi-layer coating comprising: forming a first basecoat layer over at least a portion of a substrate by depositing a first basecoat composition onto at least a portion of the substrate; and forming a second basecoat layer over at least a portion of the first basecoat layer by depositing a second basecoat composition directly onto at least a portion of (1) the first basecoat layer after the first basecoat composition is dehydrated or (2) the first basecoat composition before the first basecoat composition is dehydrated. The first basecoat composition and second basecoat composition are dehydrated at a temperature within a range of from ambient temperature to 90° C. for two minutes or less, and at least one of the first basecoat layer and the second basecoat layer is formed from a first basecoat composition comprising: (a) a melamine resin comprising imino and methylol functional groups that together comprise 30 mole % or greater of the total functionality of the melamine resin; and (b) at least one polymer reactive with (a) that is obtained from components comprising polytetrahydrofuran and a carboxylic acid or anhydride thereof. The polytetrahydrofuran comprises greater than 15 weight % of the components that form the polymer (b) and the carboxylic acid or anhydride thereof comprises greater than 5 weight % of the components that form the polymer (b). The polymer (b) has an acid value of at least 15 based on the total resin solids of the polymer (b).

DESCRIPTION OF THE INVENTION

Figure 1A:
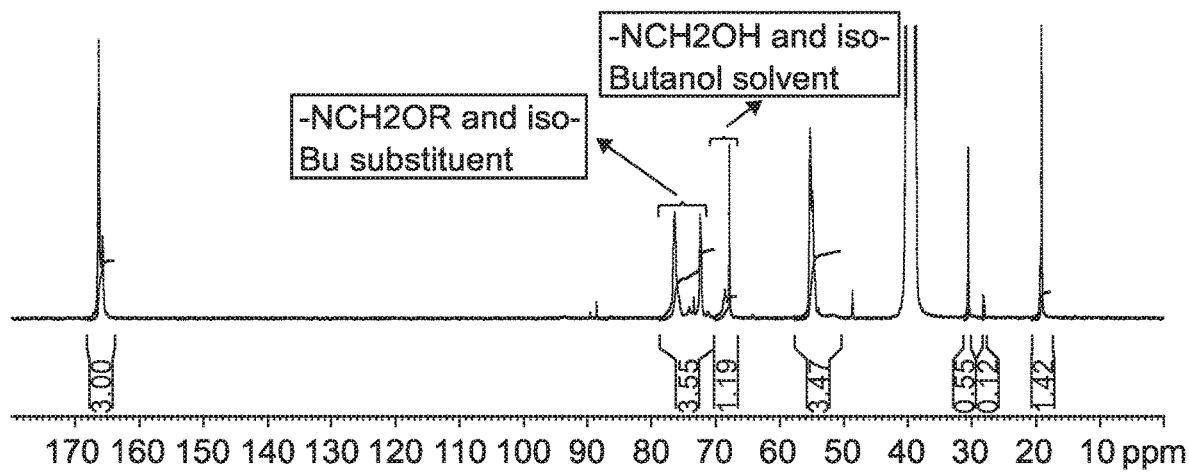
FIG. 1a is a $^{13}$C-NMR spectra obtained for the melamine of Resimene® HM 2608.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an"

means "at least one" unless specifically stated otherwise. For example, "a" melamine resin, "a" polymer, "a" coating composition, and the like refer to one or more of any of these items.

As previously described, the present invention is directed to a coating composition comprising a melamine resin and at least one polymer reactive with the melamine resin. As used herein, a "melamine resin" refers to a resin with melamine rings terminated with multiple hydroxyl groups derived from formaldehyde. Further, the term "resin" is used interchangeably with "polymer." As used herein, the term "polymer" refers to oligomers and homopolymers (e.g., prepared from a single monomer species), copolymers (e.g., prepared from at least two monomer species), terpolymers (e.g., prepared from at least three monomer species) and graft polymers.

The melamine resin used for the present invention may be the resin obtained by addition-condensation of melamine with formaldehyde by methods known to the art, or the resin obtained by further addition-condensation of such resins with various alcohols such as methanol, butanol or isobutanol. Further, the melamine resin used with the present invention comprises imino and methylol functional groups. The imino and methylol functional groups together comprise 30 mole % or greater of the total functionality of the melamine resin, or 35 mole % or greater of the total functionality of the melamine resin, or 40 mole % or greater of the total functionality of the melamine resin, or 50 mole % or greater of the total functionality of the melamine resin, or 55 mole % or greater of the total functionality of the melamine resin, or 60 mole % or greater of the total functionality of the melamine resin, or 70 mole % or greater of the total functionality of the melamine resin, or 80 mole % or greater of the total functionality of the melamine resin, or 90 mole % or greater of the total functionality of the melamine resin, or up to 100 mole % of the total functionality of the melamine resin. The imino and methylol functional groups together can comprise an amount within a range such as, for example, from 30 mole % to 80 mole %, or from 40 mole % to 80 mole %, or from 50 mole % to 70 mole %, of the total functionality of the melamine resin.

It is appreciated that the amount of the imino functional groups on the melamine resin can be greater than the amount of the methylol functional groups on the melamine resin. Alternatively, the amount of the methylol functional groups on the melamine resin can be greater than the amount of the imino functional groups on the melamine resin.

The mole % of the functional groups on the melamine resin is determined by quantitative $^{13}$C-NMR. Quantitative $^{13}$C-NMR data was acquired in a Bruker Avance II spectrometer operating at a carbon frequency of 75.48 MHz NMR. Dimethyl sulfoxide-$d_6$ (DMSO-$d_6$) was used as the NMR solvent. Cr(acac)$_3$ was used as a relaxation agent for quantitative $^3$C NMR, which was recorded with relaxation times of 3s, a pulse angle of 90 degree, and an acquisition time of 0.66s. One possible structure of a melamine resin is shown below. Each triazine ring is substituted by six functional groups. In the structure shown below, the triazine is substituted with one imino group (—NH), one methylol group (—CH$_2$OH), two methoxy groups (—CH$_2$OMe), one n-butoxy group (—CH$_2$OBu) and one isobutoxy group (~CH$_2$OisoBu). A fraction of the six functional groups on each triazine ring may be bridges to other triazine rings (often referred to as crosslinks). These bridges should still be considered as functional groups for the sake of calculating the percentage functional groups on the melamine that are imino or methylol. Specifically, as will be seen below, since the level of imino groups cannot be determined directly by $^{13}$C-NMR, it has to be determined by difference between the theoretical six functional groups per triazine ring and the level other functional groups (which can be determined directly). The bridge groups, the level of which can be determined by $^{13}$C-NMR, should be included when performing this calculation.

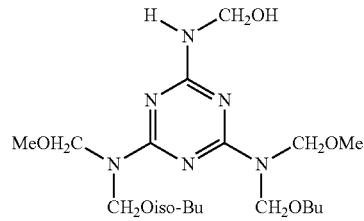

Figure 1B:
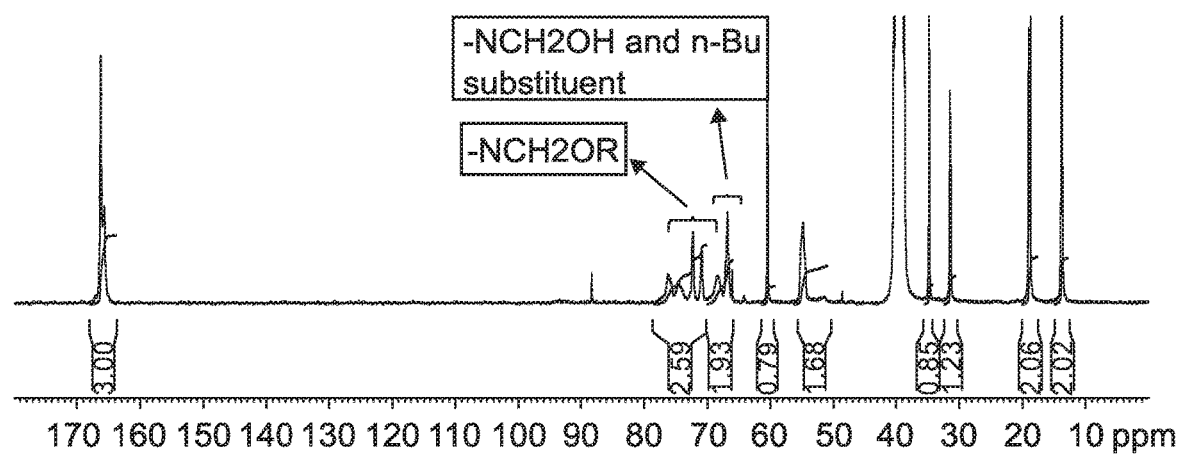
FIG. 1b is a $^{13}$C-NMR spectra obtained for the melamine of Cymel® 202.

Examples of characteristic $^{13}$C-NMR peaks for typical substituents are 55 ppm (—OMe), 28 ppm (iso-Bu), 90 ppm (bridge or crosslink), 13/31.5/64 ppm (-nBu). The carbon peak for —NCH$_2$OH shows up in the range of 66 to 70 ppm, and carbon peaks for —NCH$_2$OR shows up in the range of 70-79 ppm (where R includes an alkoxy group or a bridge group to another triazine ring). Further, —NCH$_2$OH/—NCH$_2$OR carbon peaks could be overlapping with substituent or solvent peaks. In FIGS. 1a and 1b, for example, iso-butanol solvent is overlapping with —NCH$_2$OH carbon in $^{13}$C NMR spectrum of Resimene® HM 2608 (melamine formaldehyde resin, commercially available from INEOS). Therefore, these peaks from substituents or solvents need to be considered to calculate the mole % of imino group or methylol group.

When using the $^{13}$C-NMR data to calculate the percentage of melamine functional groups that are imino and/or methylol, the triazine ring carbons (166 ppm) are normalized to be 3. For each triazine ring, there are theoretically 6 substituents. Mole % of NH and methylol are calculated from the peak intensities after normalizing the triazine ring carbons to 3.

The previously described procedure is illustrated for two melamines, Resimene® HM 2608 (melamine formaldehyde resin, commercially available from INEOS) and Cymel® 202 (melamine formaldehyde resin, commercially available from Alnnex), using the $^{13}$C-NMR obtained for these melamines and which is shown in FIG. 1a (Resimene® HM 2608) and FIG. 1b (Cymel® 202).

The mole % of imino groups is calculated using the following equation 1: Mole % imino=100×(6–I$_{-NCH2OR}$–I$_{-NCH2OH}$)/6. Further, the mole % of methylol groups is calculated by equation 2: Mole % methylol=100×(I$_{-NCH2OH}$)/6.

With respect to equations 1 and 2, R is the alkyl group and I$_{-NCH2OR}$ is the peak intensity of —NCH$_2$OR carbons, which can be obtained by I$_{-NCH2OR}$=I$_{(70-79\ ppm)}$–I$_{-isoBu\ substituent\ (28\ ppm)}$. Further, I$_{-NCH2OH}$ is the peak intensity of —NCH$_2$OH carbons, which can be obtained by I$_{-NCH2OH}$=I$_{(66-70\ ppm)}$–I$_{-nBu\ substituent\ (31.5\ ppm)}$–I$_{-isoButanol\ (30.5\ ppm)}$.

For Resimene® HM 2608, the mole % calculation for imino using equation 1 is illustrated as follows: Mole % imino=100×(6–I$_{-NCH2OR}$–I$_{-NCH2OH}$)/6=100×[6–(3.55–0.12)–(1.19–0.55)]/6=32.2%. For Resimene® HM 2608, the mole % calculation for methylol using equation 2 is illustrated as follows: Mole % methylol=100×(I$_{-NCH2OH}$)/6=100×(0.64)/6=10.7%.

For Cymel® 202, the mole % calculation for imino using equation 1 is illustrated as follows: Mole % imino=100×(6−$I_{NCHOR}$−$I_{NCH2OH}$)/6=100×[6−2.59−(1.93−1.23)]/6=45.2%. For Cymel® 202, the mole % calculation for methylol using equation 2 is illustrated as follows: Mole % methylol=100×($I_{NCH2OH}$)/6=100×(0.7)/6=11.7%.

The previously described method of determining the mole % of the functional groups on the melamine resin is referred to herein as the "melamine functional group mole % method". It will be appreciated that the presence of other components or other types of substituents or solvents could generate additional peaks not described above or interfere with peak integrals, for example, $NCH_2OR$ carbons (70-79 ppm) in 13C NMR, and their contribution would be considered for calculation of imino and methylol functionalities.

It is appreciated that when the imino and methylol functional groups together comprise less than 100 mole % of the total functionality of the melamine resin, one or more other functional groups make up the remaining mole % of the total functionality of the melamine resin. Non-limiting examples of additional functional groups include methoxy groups (—$CH_2OMe$), n-butoxy groups (—$CH_2OBu$), isobutoxy groups, and combinations thereof. Alternatively, the melamine resin can be free of all other functional groups except for the imino and methylol functional groups. In such examples, the imino and methylol functional groups together comprise 100 mole % of the total functionality of the melamine resin.

The mole % of functional groups on the melamine that are bridges to other triazine rings (or crosslinks) can also be determined by $^{13}$C-NMR characterization. The mole % of functional groups on the melamine that are bridges to other triazine rings (or crosslinks) can be less than 10 mole % of the total functionality of the melamine resin, or less than 5 mole % of the total functionality of the melamine resin, or less than 3 mole % of the total functionality of the melamine resin, or less than 2 mole % of the total functionality of the melamine resin.

The melamine resin of the present invention can comprise at least 5 weight %, at 10 weight %, or at least 15 weight %, based on the total resin solids of the coating composition. The melamine resin of the present invention can also comprise up to 40 weight %, up to 35 weight %, or up to 30 weight %, based on the total resin solids of the coating composition. The melamine resin of the present invention can further comprise an amount within a range such as from 5 weight % to 40 weight %, or from 15 weight % to 30 weight %, or from 5 weight % to 40 weight %, or from 10 weight % to 35 weight %, based on the total resin solids of the coating composition.

As indicated, the coating composition also comprises at least one polymer reactive with the melamine resin. The polymer reactive with the melamine resin is obtained from components comprising polytetrahydrofuran and a carboxylic acid or an anhydride thereof. The carboxylic acid or anhydride can be selected from various types of polycarboxylic acids or the anhydrides thereof, such as from a dicarboxylic acid or anhydride thereof, or from a polycarboxylic acid having three or more carboxylic acid groups or the anhydrides thereof. The carboxylic acid or anhydride thereof can also be selected from compounds having aromatic rings or aliphatic structures. As used herein, an "aromatic group" refers to a cyclically conjugated hydrocarbon with a stability (due to delocalization) that is significantly greater than that of a hypothetical localized structure. Further, the term "aliphatic" refers to non-aromatic straight, branched, or cyclic hydrocarbon structures that contain saturated carbon bonds.

Non-limiting examples of carboxylic acids include glutaric acid, succinic acid, malonic acid, oxalic acid, trimellitic acid, phthalic acid, isophthalic acid, hexahydrophthalic acid, adipic acid, maleic acid, and combinations thereof. As indicated, an anhydride can be used, such as an anhydride of any of the previously described carboxylic acids. Non-limiting examples of such anhydrides include trimellitic anhydride, phthalic anhydride, maleic anhydride, succinic anhydride, malonic anhydride, oxalic anhydride, hexahydrophthalic anhydride, adipic anhydride, and combinations thereof.

As indicated, the carboxylic acid or anhydride thereof can be selected from compounds having aromatic rings or aliphatic structures. For instance, the carboxylic acid or anhydride thereof can be selected from an aromatic compound in which the carboxylic acid or anhydride functional groups are bonded directly to the aromatic ring(s) such that there is no interrupting atoms between the aromatic ring(s) and the attached carboxylic acid or anhydride functional groups (a non-limiting example being trimellitic anhydride).

The polymer reactive with the melamine resin can also be prepared with other components in addition to the previously described polytetrahydrofuran and carboxylic acid or anhydride thereof. Non-limiting examples of additional components that can be used to form the polymer include polyols in addition to the polytetrahydrofuran, additional compounds containing one or more carboxylic acid groups or anhydrides thereof, ethylenically unsaturated compounds, polyisocyanates, and combinations thereof.

As used herein, "ethylenically unsaturated" refers to a group having at least one carbon-carbon double bond. Non-limiting examples of ethylenically unsaturated groups include, but are not limited to, (meth)acrylate groups, vinyl groups, and combinations thereof. As used herein, the term "(meth)acrylate" refers to both the methacrylate and the acrylate.

Examples of polyols include glycols, polyether polyols, polyester polyols, copolymers thereof, and combinations thereof. Non-limiting examples of glycols include ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Non-limiting examples of suitable polyether polyols in addition to the polytetrahydrofuran include polyethylene glycol, polypropylene glycol, polybutylene glycol, and combinations thereof.

Other suitable polyols include, but are not limited to, cyclohexanedimethanol, 2-ethyl-1,6-hexanediol, 1,3-propanediol, 1,4-butanediol, neopentyl glycol, trimethylol propane, 1,2,6-hexantriol, glycerol, and combinations thereof. It is appreciated that the polyol can be selected from diols and/or from compounds having 3 or more hydroxyl groups.

The additional compounds containing one or more carboxylic acid groups or anhydrides can include any of the previously described carboxylic acids and anhydrides provided that the additional compound is different from the first carboxylic acid or anhydride. For instance, the components that form the polymer reactive with the melamine resin can include both trimellitic anhydride and maleic anhydride.

Non-limiting examples of ethylenically unsaturated monomers include, but are not limited to, alkyl esters of (meth)acrylic acid, hydroxyalkyl esters of (meth)acrylic acid, acid group containing ethylenically unsaturated monomers, vinyl aromatic monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from C2a diols such as butane diol and hexane diol can also be used.

Non-limiting examples of hydroxyalkyl esters of (meth) acrylic acid include hydroxymethyl (meth)acrylate, hydroxyethyl (meth)acrylate, hydroxypropyl (meth)acrylate, hydroxybutyl (meth)acrylate, and combinations thereof.

Non-limiting examples of acid group containing ethylenically unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butylstyrene, vinyl naphthalene, vinyl toluene, divinyl aromatic monomers, such as divinyl benzene, and combinations thereof.

Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), α-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

It is appreciated that the previously described optional additional components can be used to modify or adjust the properties of the polymer and the final coating formed therewith. For instance, the polymer can be formed with additional components, such as an additional polyol, that can provide a faster cure at lower bake temperatures such as temperatures of 80° C. or lower.

The polytetrahydrofuran used to form the polymer can comprise greater than 20 weight % of the components that form the polymer, or greater than 30 weight % of the components that form the polymer, or greater than 40 weight % of the components that form the polymer. The polytetrahydrofuran can also comprise up to 50 weight % of the components that form the polymer, or up to 60 weight % of the components that form the polymer, or up to 70 weight % of the components that form the polymer, or up to 80 weight % of the components that form the polymer, or up to 90 weight % of the components that form the polymer. The polytetrahydrofuran can further comprise an amount within a range such as from 20 weight % to 90 weight % of the components that form the polymer, or from 40 weight % to 80 weight % of the components that form the polymer, or from 50 weight % to 70 weight % of the components that form the polymer, or from 30 weight % to 40 weight % of the components that form the polymer.

The carboxylic acid or anhydride used to form the polymer can comprise greater than 5 weight % of the components that form the polymer, or greater than 8 weight % of the components that form the polymer. The carboxylic acid or anhydride can also comprise up to 20 weight % of the components that form the polymer, or up to 15 weight % of the components that form the polymer, or up to 12 weight % of the components that form the polymer. The carboxylic acid or anhydride can further comprise an amount within a range such as from 5 weight % to 20 weight % of the components that form the polymer, or from 8 weight % to 15 weight % of the components that form the polymer, or from 8 weight % to 12 weight % of the components that form the polymer, or from 7 weight % to 10 weight % of the components that form the polymer.

It is appreciated that one or more of the previously described additional components can make up the remaining amount of components used to form the polymer reactive with the melamine resin. For example, the polymer can be prepared with polytetrahydrofuran, a carboxylic acid or anhydride, a polyol that is different from the polytetrahydrofuran, and another carboxylic acid or anhydride that is different from the first carboxylic acid or anhydride.

The resulting polymer prepared from the previously described components comprises at least ether linkages and carboxylic acid functional groups. The resulting polymer can also comprise ester linkages and/or urethane linkages as well as additional functional groups such as hydroxyl functional groups. For instance, the resulting polymer can comprise ether linkages, ester linkages, carboxylic acid functional groups, and hydroxyl functional groups. The resulting polymer can also comprise additional linkages and functional groups including, but not limited to, the previously described additional functional groups.

The polymer that is reactive with the melamine resin can have an acid value of at least 15, or at least 20, based on the total resin solids of the polymer. The polymer that is reactive with the melamine resin can have an acid value of up to 35 or up to 30, based on the total resin solids of the polymer. The polymer that is reactive with the melamine resin can have an acid value within a range such as for example from 20 to 30, based on the total resin solids of the polymer. The acid value is measured by titrating with a standardized solution of a strong base such as potassium hydroxide.

The acid functionality of the polymer that is reactive with the melamine resin can have a pKa of less than 5, or less than 4, or less than 3.5, or less than 3, or less than 2.5, or less than 2. The acid functionality of the polymer that is reactive with the melamine resin can be within a pKa range such as for example from 1.5 to 4.5. The pKa value is the negative (decadic) logarithms of the acidic dissociation constant, and is determined according to the titration method described in Lange's Handbook of Chemistry, 15th edition, section 8.2.1.

The carboxylic acid functionality found on the polymer can be provided by the first carboxylic acid or anhydride only. Alternatively, when additional carboxylic acid functional compounds and/or anhydrides are used to form the polymer, the carboxylic acid functionality found on the polymer is provided by the first carboxylic acid or anhydride and the additional carboxylic acid functional compounds and/or anhydrides.

The polymer can also comprise a hydroxyl equivalent weight of from 1500 to 5000, or from 2000 to 3000, as measured by reacting the dried polymer with an excess amount of acetic anhydride and titrating with potassium hydroxide.

The polymer reactive with the melamine resin can comprise at least 50 weight %, at 60 weight %, or at least 70 weight %, based on the total resin solids of the coating composition. The polymer reactive with the melamine resin can also comprise up to 90 weight % or up to 80 weight %, based on the total resin solids of the coating composition. The polymer reactive with the melamine resin can further comprise an amount within a range such as from 50 weight % to 90 weight %, or from 60 weight % to 80 weight %, or from 70 weight % to 80 weight %, or from 70 weight % to 90 weight %, based on the total resin solids of the coating composition.

The polymer reactive with the melamine resin can comprise polymeric core-shell particles in which the polymeric core is at least partially encapsulated by the polymeric shell, a self-emulsifying dispersion polymer, or a combination thereof.

As used herein, a core-shell particle in which the core is at least partially encapsulated by the shell refers to a particle comprising (i) at least a first material or materials that form the center of the particle (i.e., the core) and (ii) at least a second material or materials (i.e., the shell) that form a layer over at least a portion of the surface of the first material(s) (i.e., the core). It is appreciated that the first material(s) that forms the core is different from the second material(s) that forms the shell. Further, the core-shell particles can have various shapes (or morphologies) and sizes. For example, the core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size can for example be determined with a Zetasize 3000HS following the instructions in the Zetasize 3000HS manual.

As indicated, the core-shell particles comprise a polymeric core as well as a polymeric shell. A "polymeric core" means that the core of the core-shell particle comprises one or more polymers and a "polymeric shell" means that the shell of the core-shell particle comprises one or more polymers.

The polymeric shell of the core-shell particles is obtained from the previously described components comprising the polytetrahydrofuran, a carboxylic acid or anhydride thereof, hydroxyl functional ethylenically unsaturated compound(s) and, optionally, other additional components (e.g., additional polyols, additional carboxylic acid and/or anhydrides, polyisocyanates, and/or combinations thereof). It is appreciated that the polymer that forms the polymeric shell can have the previously described characteristics such as the previously described acid values. For instance, the polymeric shell can have an acid value as previously described, such as an acid value of at least 15, based on the total resin solids of the polymer that forms the polymeric shell. Further, the polymeric core typically comprises an addition polymer derived from ethylenically unsaturated monomers.

The polytetrahydrofuran can comprise an amount within a range such as from 20 weight % to 90 weight % of the components that form the polymeric shell, or from 40 weight % to 80 weight % of the components that form the polymeric shell, or from 50 weight % to 70 weight % of the components that form the polymeric shell, or from 55 to 65 weight % of the polymeric shell.

The carboxylic acid or anhydride can comprise an amount within a range such as from 5 weight % to 20 weight % of the components that form the polymeric shell, or from 8 weight % to 18 weight % of the components that form the polymeric shell, or from 10 weight % to 16 weight % of the components that form the polymeric shell, or from 12 to 15 weight % of the polymeric shell.

The polymeric shell is also covalently bonded to at least a portion of the polymeric core. For example, the polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond. As used herein, a "prepolymer" refers to a polymer precursor capable of further reactions or polymerization by one or more reactive groups to form a higher molecular mass or cross-linked state.

The polymeric core and polymeric shell of the core-shell particles are also prepared to provide a hydrophilic polymeric shell with enhanced water-dispersibility/stability and a hydrophobic polymeric core. As used herein, the term "hydrophilic" refers to polymers, monomers, and other materials that have an affinity for water and which will disperse or dissolve in water or other aqueous based mediums. Hydrophilic materials, such as hydrophilic polymers, typically have water-dispersible groups. A "water-dispersible group" refers to a group having or formed from one or more hydrophilic functional groups that have an affinity for water and which help disperse a compound, such as a polymer, in water or other aqueous based mediums. Further, as used herein, the term "hydrophobic" refers to polymers, monomers, and other materials that lack an affinity for water or other aqueous based mediums and tend to repel, not dissolve or disperse in, and/or not be wetted by water or other aqueous based mediums. Hydrophobic materials, such as hydrophobic polymers, are often free of water-dispersible groups.

As indicated, the polymeric core and polymeric shell of the core-shell particles can be prepared to provide a hydrophilic polymeric shell with enhanced water-dispersibility/stability and a hydrophobic polymeric core. Thus, the polymeric shell can comprise hydrophilic water-dispersible groups while the polymeric core can be free of hydrophilic water-dispersible groups. The hydrophilic water-dispersible groups can increase the water-dispersibility/stability of the polymeric shell in an aqueous medium so that the polymeric shell at least partially encapsulates the hydrophobic core.

As previously described, the water-dispersible groups comprise one or more hydrophilic functional groups. For example, the polymer(s) that form the hydrophilic polymeric shell can comprise ionic or ionizable groups such as the carboxylic acid functional groups or salts thereof. The carboxylic acid functional groups can be at least partially neutralized (i.e., at least 30% of the total neutralization equivalent) by a base, such as a volatile amine, to form a salt group. A volatile amine refers as an amine compound having an initial boiling point of less than or equal to 250° C. as measured at a standard atmospheric pressure of 101.3 kPa. Examples of suitable volatile amines are ammonia, dimethylamine, trimethylamine, monoethanolamine, and dimethylethanolamine. It is appreciated that the amines will evaporate during the formation of the coating to expose the carboxylic acid functional groups and allow the carboxylic acid functional groups to undergo further reactions. Other non-limiting examples of water-dispersible groups include polyoxyalkylene groups such as by using polyethylene/propylene glycol ether materials for example.

As indicated, the polymer reactive with the melamine resin can comprise a self-emulsifying dispersion polymer. As used herein, a self-emulsifying dispersion polymer refers to a polymer that contains hydrophilic functionality and is not synthesized initially as an aqueous dispersion, and then mixed with water to form an aqueous dispersion.

The self-emulsifying dispersion polymer of the present invention is obtained from the previously described components comprising the polytetrahydrofuran, the carboxylic acid or anhydride, and, optionally, other additional components (e.g., additional polyols, additional carboxylic acids or anhydrides, polyisocyanates, ethylenically unsaturated compounds, and/or combinations thereof). For example, the self-emulsifying dispersion polymer is typically prepared with polytetrahydrofuran, a carboxylic acid or anhydride, a polyol that is different from the polytetrahydrofuran, and another carboxylic acid or anhydride that is different from the first carboxylic acid or anhydride.

The polytetrahydrofuran can comprise an amount within a range such as from 20 weight % to 90 weight % of the components that form the self-emulsifying dispersion polymer, or from 40 weight % to 80 weight % of the components that form the self-emulsifying dispersion polymer, or from 50 weight % to 70 weight % of the components that form the self-emulsifying dispersion polymer, or from 80 to 90 weight % of the self-emulsifying dispersion polymer.

The carboxylic acid or anhydride can comprise an amount within a range such as from 5 weight % to 20 weight % of the components that form the self-emulsifying dispersion polymer, or from 8 weight % to 18 weight % of the components that form the self-emulsifying dispersion polymer, or from 10 weight % to 16 weight % of the components that form the self-emulsifying dispersion polymer, or from 14 to 16 weight % of the self-emulsifying dispersion polymer.

As indicated, the polymer reactive with the melamine resin can comprise both the previously described polymeric core-shell particles and the self-emulsifying dispersion polymer. When the coating composition of the present invention comprises both the polymeric core-shell particles and the self-emulsifying dispersion polymer, the coating composition can comprise a greater amount of the polymeric core-shell particles than the self-emulsifying dispersion polymer or a greater amount of the self-emulsifying dispersion polymer than the polymeric core-shell particles.

It is appreciated that the melamine resin, polymer reactive with the melamine resin, and other optional components described herein are dispersed in an aqueous medium. As used herein, an "aqueous medium" refers to a liquid medium comprising greater than 50 weight % water, based on the total weight of the liquid medium. Such aqueous liquid mediums can for example comprise at least 60 weight % water, or at least 70 weight % water, or at least 80 weight % water, or at least 90 weight % water, or at least 95 weight % water, or 100 weight % water, based on the total weight of the liquid medium. The solvents that, if present, make up less than 50 weight % of the liquid medium include organic solvents. Non-limiting examples of suitable organic solvents include polar organic solvents, e.g. protic organic solvents such as glycols, glycol ether alcohols, alcohols, volatile ketones, glycol diethers, esters, and diesters. Other non-limiting examples of organic solvents include aromatic and aliphatic hydrocarbons.

The coating composition can comprise additional materials including, but not limited to, additional resins, such as additional film-forming resins, and additional crosslinkers. As used herein, a "film-forming resin" refers to a resin that when used in a coating composition can form a self-supporting continuous film on at least a horizontal surface through dehydration and/or upon curing. The term "dehydration" refers to the removal of water and/or other solvents. It is appreciated that dehydration can also cause at least partial curing of a resinous material. Further, the terms "curable", "cure", and the like, mean that at least a portion of the resinous materials in a composition is crosslinked or crosslinkable.

The additional resin can include any of a variety of thermoplastic and/or thermosetting film-forming resins known in the art. The term "thermosetting" refers to resins that "set" irreversibly upon curing or crosslinking, wherein the polymer chains of the resins are joined together by covalent bonds. Once cured or crosslinked, a thermosetting resin will not melt upon the application of heat and is insoluble in solvents. As noted, the film-forming resin can also include a thermoplastic film-forming resin. The term "thermoplastic" refers to resins that are not joined by covalent bonds and, thereby, can undergo liquid flow upon heating and can be soluble in certain solvents.

Non-limiting examples of suitable additional resins include polyurethanes, polyesters such as polyester polyols, polyamides, polyethers, polysiloxanes, fluoropolymers, polysulfides, polythioethers, polyureas, (meth)acrylic resins, epoxy resins, vinyl resins, and combinations thereof. The additional resins can also include particulate and non-particulate resins.

The additional resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), (meth)acrylate groups, and combinations thereof. Thermosetting coating compositions typically comprise a crosslinker that may be selected from any of the crosslinkers known in the art to react with the functionality of the resins used in the coating compositions. Alternatively, a thermosetting film-forming resin can be used having functional groups that are reactive with themselves; in this manner, such thermosetting resins are self-crosslinking.

As indicated, the coating composition can also comprise additional crosslinkers. As used herein, a "crosslinking agent", "crosslinker", and like terms refers to a molecule comprising two or more functional groups that are reactive with other functional groups and which is capable of linking two or more monomers or polymer molecules through chemical bonds. Non-limiting examples of crosslinkers include polyhydrazides, carbodiimides, polyols, phenolic resins, epoxy resins, beta-hydroxy (alkyl) amide resins, hydroxy (alkyl) urea resins, oxazoline, alkylated carbamate resins, (meth)acrylates, isocyanates, blocked isocyanates, polyacids, anhydrides, organometallic acid-functional materials, polyamines, polyamides, aminoplasts other than the previously described melamine resin, aziridines, and combinations thereof. The coating compositions of the present invention can also be free of additional film-forming resins and/or crosslinkers such as being free of polyisocyanates.

The coating composition can also include other additional materials such as a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, and bismuth vanadate.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical. Inc.

The colorant which can be used with the coating composition of the present invention can also comprise a special effect composition or pigment. As used herein, a "special effect composition or pigment" refers to a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Non-limiting examples of special effect compositions can include transparent coated mica and/or synthetic mica, coated silica, coated alumina, aluminum flakes, a transparent liquid crystal pigment, a liquid crystal coating, and combinations thereof.

Other non-limiting examples of further materials that can optionally be used with the coating composition of the present invention include plasticizers, abrasion resistant particles, anti-oxidants, hindered amine light stabilizers, UV light absorbers and stabilizers, surfactants, flow and surface control agents, thixotropic agents, catalysts, reaction inhibitors, and other customary auxiliaries.

It is appreciated that the components that form the coating composition can be selected to form a one-component composition ("1K"). As used herein, a "one-component composition" refers to a composition wherein all the coating components are maintained in the same container after manufacture, during storage, etc. In contrast, a multi-component composition, such as a two component composition ("2K") or more, has at least two components that are maintained in a different container after manufacture, during storage, etc. prior to application and formation of the coating over a substrate. Thus, the coating composition can be free of components that are typically used to form a multi-component composition, such as being free of polyisocyanates for example.

The coating composition of the present invention can be deposited over at least a portion of a substrate and dehydrated and/or cured to form a coating layer. The coating composition of the present invention can be applied to a wide range of substrates known in the coatings industry. For example, the coating composition can be applied to automotive substrates, industrial substrates, aircraft and aircraft substrates and components, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather, both synthetic and natural, and the like. The substrate can be one that has been already treated in some manner, such as to impart visual and/or color effect, a protective pretreatment or other coating layer, and the like.

The coating composition of the present invention is particularly beneficial when applied to metal substrates used for fabricating vehicles. As used herein, "vehicle" or variations thereof includes, but is not limited to, civilian, commercial and military aircraft, and/or land vehicles such as airplanes, helicopters, cars, motorcycles, and/or trucks. For example, the coatings of the present invention are particularly beneficial when applied to metallic substrates that are used to fabricate cars, trucks, and tractors.

The coating composition of the present invention is also particularly beneficial when applied to substrates that form a package, such as metal substrates that form a package. Suitable metal packaging substrates include, but are not limited to, food and/or beverage packaging, components used to fabricate such packaging or monobloc aerosol cans or tubes. Suitable monobloc aerosol cans or tubes include, but are not limited to, deodorant and hair spray containers. Monobloc aerosol cans or tubes may be aluminium monobloc aerosol cans or tubes.

As used herein, a "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage package or bakeware in which a consumer might make and/or store food; such a package would only maintain the freshness or integrity of the food item for a relatively short period. "Package" as used herein means the complete package itself or any component thereof, such as an end, lid, cap, and the like. For example, a "package" coated with the coating compositions described herein might include a metal can in which only the can end or a portion thereof is coated. A package according to the present invention can be made of metal or non-metal, for example, plastic or laminate, and be in any form. An example of a suitable package is a laminate tube. Another example of a suitable package is metal can. The term "metal can" includes any type of metal can, package or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, packages or any type of receptacle or portion thereof used to hold any type of food and/or beverage. "Beverage can" may also be used to refer more specifically to a food can in which a beverage is packaged. The term "metal can(s)" specifically includes food cans, including beverage cans, and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated with the composition of the present invention can also include plastic bottles, plastic tubes, laminates and flexible packaging, such as those made from PE, PP, PET and the like. Such packaging could hold, for example, food, toothpaste, personal care products and the like.

The coating composition of the present invention may be applied to the interior and/or the exterior of the package. For example, the coating can be roll-coated onto metal used to make a two-piece food can, a three-piece food can, can end stock and/or cap/closure stock. The coating is applied to a coil or sheet by roll coating; the coating is then cured and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can be applied to the "side stripe" of a metal can, which will be understood as the seam formed during fabrication of a three-piece can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans. The coating can be applied to can stock before formation of the can or can part, or can be applied to the can or can part after formation. Any material used for the formation of food cans can be treated according to the present methods. Particularly suitable substrates include tin-plated steel, tin-free steel and black-plated steel.

The coating composition can be applied over at least a portion of the substrate by any means standard in the art, such as spraying, electrostatic spraying, dipping, rolling, brushing, and the like. Once applied, the composition can be dehydrated and/or cured to form the coating layer. The coating compositions of the present invention can be cured with various methods including, but not limited to, applying heat.

It was found that the coating composition of the present invention can be dehydrated at ambient temperatures (e.g. 20° C.) to 90° C., or from ambient temperatures to 80° C., or from ambient temperatures to 70° C., or from ambient temperatures to 60° C., or from 40° C. to 80° C., or from 40° C. to 70° C. The coating composition can be dehydrated at these temperatures for a period of time of less than 2 minutes, or less than 1 minute. The period of time for dehydrating the coating composition is the designated period of time for dehydration and does not include the time it takes to transfer and subject the coating composition to another step such as a curing step.

The coating composition can also be cured at comparatively low temperatures. For instance, the coating composition can be cured using heat at temperatures of 140° C., or less, or 120° C., or less, or 100° C., or less, or 80° C., or less.

It was found that the coatings of the present invention can be formed at lower dehydration/cure temperatures than those typically required in other coatings commonly applied to substrates such as, for example, substrates that form a package or vehicle. The coatings also provide desired appearance and mechanical/chemical properties, such as good solvent resistance.

The present invention also relates to a multi-layer coating that comprises at least a first basecoat layer and a second basecoat layer. As explained in further detail herein, the multi-layer coating can include additional coating layers including, but not limited to, a primer layer, a topcoat layer, or a combination thereof. A "basecoat layer" refers to a coating layer that is deposited onto a primer and/or directly onto a substrate, optionally including components (such as pigments) that impact the color and/or provide other visual impact. A "topcoat" refers to an uppermost coating that is deposited over another coating layer such as a basecoat to provide a protective and/or decorative layer. A "primer layer" refers to an undercoating that may be deposited onto a substrate in order to prepare the surface for application of a protective or decorative coating system.

The first basecoat layer and/or the second basecoat of the multi-layer coating is formed from the previously described coating composition that comprises the melamine resin and the at least one polymer reactive with the melamine resin. The coating composition used to form the first and/or second basecoat layer can also include one or more of the previously described components such as the additional film-forming resins, crosslinkers, colorants, and/or other optional materials.

The coating compositions used to form the first and second basecoat layers can be the same or different. For instance, the first and second basecoat layers can each comprise a coating composition comprising the melamine resin and the same or different types of polymer(s) reactive with the melamine resin (i.e., the polymeric core-shell particles and/or self-emulsifying dispersion polymer previously described) such that each layer forms a one component composition. In some examples, one of the basecoat layers can be formed from the previously described coating composition and which comprises components that form a one-component composition, while the other coating layer can be formed from components that form a multi-layer composition such as a two-component composition that includes, for example, a polyisocyanate and polyol functional resin.

Alternatively, one of the first or second basecoat layer can be formed with a different coating composition. The different coating layer can be formed with various components including the various resins and crosslinkers previously described such as, for example, with carboxylic acid functional polymeric core-shell particles and which can utilize various crosslinkers such as, for example, carbodiimides.

The first and second basecoat compositions can also comprise the same or different additional resins, crosslinkers, colorants, and other optional materials previously described. For example, the second basecoat composition can comprise special effect pigments and the first basecoat composition can be free of special effect pigments. As such, the first basecoat composition can for example only comprise pigments that impart a continuous unchanging color and the second basecoat layer can for example only comprise special effect pigments. Alternatively, the first basecoat composition can comprise special effect pigments and the second basecoat composition can be free of special effect pigments. As such, the second basecoat composition can for example only comprise pigments that impart a continuous unchanging color and the first basecoat layer can for example only comprise special effect pigments.

The first and second basecoat layers can both be formed from a one-component composition as previously described. Alternatively, one of the basecoat layers can formed from a one-component composition, while the other basecoat layer can formed from a multi-component composition such as a two-component composition.

The first basecoat composition can be applied directly over at least a portion of the substrate by any means standard in the art, such as spraying, electrostatic spraying, dipping, rolling, brushing, and the like. The second basecoat composition can then be applied directly over at least a portion of the first basecoat composition as a wet-on-wet process. (i.e. prior to dehydration of the first basecoat composition). The second basecoat composition can be applied by any means standard in the art, such as spraying, electrostatic spraying, dipping, rolling, brushing, and the like. After the second basecoat composition is applied, both basecoat compositions can be dehydrated simultaneously. Both basecoat compositions can be dehydrated simultaneously at ambient temperatures (e.g. 20° C.) to 90° C., or from ambient temperatures to 80° C., or from ambient temperatures to 70° C., or from ambient temperatures to 60° C., or from 40° C. to 80° C., or from 40° C. to 70° C. The coating compositions can be dehydrated, for example, at the above temperatures for a period of time of less than 2 minutes, or less than 1 minute.

The second basecoat composition can also be applied directly over at least a portion of the first basecoat layer that has been dehydrated as previously described. The second basecoat composition can then be dehydrated at ambient temperatures (e.g. 20° C.) to 90° C., or from ambient temperatures to 80°, or from ambient temperatures to 70° C., or from ambient temperatures to 60° C., or from 40° C. to 80° C., or from 40° C. to 70° C. The coating compositions can be dehydrated, for example, at the above temperatures for a period of time of less than 2 minutes, or less than 1 minute. After the dehydrating the second basecoat composition, the basecoats can be cured at temperatures of 140° C., or less, or 120° C., or less, or 100° C., or less, or 80° C., or less.

The multi-layer can also comprise a topcoat layer that is applied over at least a portion of the second basecoat layer before or after curing the basecoat layers. The topcoat layer can be formed from a coating composition that comprises a film-forming resin, a crosslinker, an aqueous or organic solvent medium, and/or any of the other materials such as those previously described. For example, the topcoat can comprise a film-forming resin and one or more polyisocyanates, such as at least one uretdione dimer, based polyisocyanate that is reactive with the film-forming resin.

The topcoat layer can be a clear topcoat layer. As used herein, a "clear coat layer" refers to a coating layer that is at least substantially transparent or fully transparent. The term "substantially transparent" refers to a coating, wherein a surface beyond the coating is at least partially visible to the naked eye when viewed through the coating. The term "fully transparent" refers to a coating, wherein a surface beyond the coating is completely visible to the naked eye when viewed through the coating. It is appreciated that the clear topcoat layer can comprise colorants, such as pigments, provided that the colorants do not interfere with the desired transparency of the clear topcoat layer. Alternatively, the clear topcoat layer is free of colorants such as pigments (i.e., unpigmented).

Non-limiting examples of topcoat layers that can be used with the multi-layer coating of the present invention include those described in U.S. Pat. No. 4,650,718 at col. 1 line 62 to col. 10 line 16; U.S. Pat. No. 5,814,410 at col. 2 line 23 to col. 9 line 54; and U.S. Pat. No. 5,891,981 at col. 2 line 22 to col. 12 line 37, all of which are incorporated by reference herein. Suitable topcoat coating compositions that can be used to form the topcoat layer also include those commercially available from PPG Industries, Inc. under the tradenames NCT®, DIAMOND COAT®, and CERAMICLEAR®.

As indicated, the topcoat layer can be cured simultaneously with the first and second basecoat layers. For instance, the topcoat layer and basecoat layers can be simultaneously cured at temperatures of 140° C., or less, or 120° C., or less, or 100° C., or less, or 80° C., or less.

The multi-layer coating according to the present invention can also comprise other optional layers including, but not limited to, additional basecoat layers as well as a primer coating layer as indicated above. The primer coating layer can be formed over at least a portion of the substrate and the first or second basecoat layer can be formed over at least a portion of the primer coating layer. Further, the additional basecoat layers can be prepared from any of the materials previously described. The additional basecoat layers can be applied, for example, over the first or second basecoat layer before applying the topcoat layer.

The primer coating layer optionally used with the multi-layer coating of the present invention can be formed from a coating composition that comprises a film-forming resin such as a cationic based resin, an anionic based resin, and/or any of the additional film-forming resins previously described. The coating composition used to form the primer coating composition can also include the previously described crosslinkers, colorants, and other optional materials.

Additionally, the primer coating composition can include a corrosion inhibitor. As used herein, a "corrosion inhibitor" refers to a component such as a material, substance, compound, or complex that reduces the rate or severity of corrosion of a surface on a metal or metal alloy substrate. The corrosion inhibitor can include, but is not limited to, an alkali metal component, an alkaline earth metal component, a transition metal component, or combinations thereof. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (iUPAC) of the periodic table of the chemical elements, and includes, e.g., titanium (Ti), Chromium (Cr), and zinc (Zn), among various others.

Specific non-limiting examples of inorganic components that act as a corrosion inhibitor include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

As indicated, the primer coating composition can be deposited directly over at least a portion of a substrate before application of the first or second basecoat composition and dehydrated and/or cured to form the primer coating layer. The primer coating composition of the present invention can be applied by any means standard in the art, such as electrocoating, spraying, electrostatic spraying, dipping, rolling, brushing, and the like. Once the primer coating composition is applied to at least a portion of the substrate, the composition can be dehydrated and/or cured to form the primer coating layer. The primer coating composition can be dehydrated and/or cured, for example, at a temperature of 175° C. to 205° C. to form the primer coating layer.

It was found that the multi-layer coatings of the present invention can be formed at lower dehydration/cure temperatures than those typically required in other coatings commonly applied to automotive substrates such as vehicles. As such, the multi-layer coatings of the present invention help reduce costs, eliminate the amount of coating equipment, and speed up the overall coating process.

The present invention is also directed to a process of preparing a multi-layer coating. The process includes: forming a first basecoat layer over at least a portion of a substrate by depositing a first coating composition onto at least a portion of the substrate; and forming a second basecoat layer over at least a portion of the first basecoat layer by depositing a second coating composition directly onto at least a portion of: (1) the first basecoat layer after the first coating composition is dehydrated; or (2) the first coating composition before the first basecoat composition is dehydrated. The first and second basecoat compositions can be dehydrated separately or simultaneously and then cured as previously described. Optionally, a topcoat layer is formed over at least a portion of the second basecoat layer by depositing a topcoat composition directly onto at least a portion of the second basecoat layer. When the topcoat layer is used, the basecoat layers and topcoat layer can be cured simultaneously.

The substrate can optionally comprise a primer coating layer and the first basecoat layer is applied over at least a portion of the primer coating layer by depositing a first basecoat composition directly onto at least a portion of the primer coating layer. The primer coating layer can be formed by depositing a primer coating composition, such as by electrodepositing an electrodepositable coating composition, onto at least a portion of the substrate prior to depositing the first basecoat composition.

The multi-coatings can be applied to any kind of substrate as described above, such as for example to automotive parts in an automotive assembly plant. In some examples, during application of the multi-layer coating in an automotive assembly plant, a metal substrate is, optionally, first passed to an electrodeposition station where the primer coating composition is electrodeposited over the metal substrate and dehydrated and/or cured. The first basecoat composition is then directly applied over the electrodeposited coating layer or, alternatively, directly applied over at least a portion of the substrate in a basecoat zone comprising one or more coating stations. The basecoat zone can be located downstream of and adjacent to an electrodeposition oven. The first basecoat station has one or more conventional applicators, e.g., bell or gun applicators, connected to or in flow communication with a source of the first basecoat composition. The first basecoat composition can be applied, e.g., sprayed, over the substrate by one or more applicators at the first basecoat station in one or more spray passes to form a first basecoat layer over the substrate.

The first basecoat can be dehydrated with a conventional drying device, such as an oven, located downstream of and/or adjacent to the second coating station and/or the first coating station. After applying the second basecoat composition, the second basecoat layer can be dehydrated separately if the first basecoat layer has been previously dehydrated. Alternatively, when the second basecoat composition is applied wet-on-wet to the first basecoat composition, both basecoat compositions can be simultaneously dehydrated. The basecoats can then be cured using an oven.

After the first basecoat composition and second basecoat composition have been dehydrated and/or cured, one or more conventional topcoat layers can be applied over the basecoat layer(s) at a topcoat station. The topcoat station includes one or more conventional applicators, e.g., bell applicators, connected to and in flow communication with a source of the topcoat composition. An oven is located downstream of and/or adjacent to the topcoat station to dehydrate and/or cure the topcoat composition separately or simultaneously with the basecoats.

A non-limiting example of an automotive assembly plant for applying a multi-layer coating is described in U.S. Pat. No. 8,846,156 at col. 3 line 1 to col. 4 line 43 and FIG. 1, which is incorporated by reference herein.

The following examples are presented to demonstrate the general principles of the invention. The invention should not be considered as limited to the specific examples presented. All parts and percentages in the examples are by weight unless otherwise indicated.

Further, in the following examples, Brookfield viscosities were measured at 25° C. on a Brookfield Viscometer DV-II+ Pro using spindle #2 at 60 RPM. Acid values and hydroxyl values were determined using a Metrohm 798 MPT Titrino automatic titrator according to ASTM D 4662-15 and ASTM E 1899-16. Non-volatile contents were measured by comparing initial sample weights to sample weights after exposure to 110° C. for 1 hour.

Weight and number average molecular weight of polymeric samples were measured by gel permeation chromatography relative to linear polystyrene standards of 800 to 900,000 Da. Gel permeation chromatography was performed using a Waters 2695 separation module with a Waters 2414 differential refractometer (RI detector). Tetrahydrofuran (THF) was used as the eluent at a flow rate of 1 ml min-1. Two PLgel Mixed-C (300×7.5 mm) columns were used for separation.

Example 1

Preparation of a Coating Composition and Evaluation of the Corresponding Coating Part A: A polyester polyol according to the present invention was first prepared from the components listed in Table 1.

TABLE 1

| Component | Amount (grams) |
|---|---|
| Charge 1 | |
| PolyTHF ® 650[1] | 845 |
| 1,6-Hexanediol | 230 |
| Maleic Anhydride | 63.7 |
| Trimellitic anhydride | 249.6 |
| Charge 2 | |
| Dowanol ® DPM[2] | 135.3 |
| Charge 3 | |
| Dimethylethanolamine | 40.5 |
| DI Water | 365 |
| Charge 4 | |
| DI Water | 1490 |

[1]Polytetrahydrofuran, commercially available from BASF Corp.
[2]Glycol ether solvent, commercially available from Dow.

To a four necked 5 liter reaction flask outfitted with a stirrer, gas inlet, thermometer and condenser, the contents of charge 1 were added. The reaction mixture was heated to a maximum temperature of 175° C. ensuring that the column head temperature did not exceed 100° C. The reaction was held until the acid value was ~40. The temperature was reduced to 165° C. and the condensation continued to an acid value of 30. The reaction mixture was then cooled to <135° C. at which time charge 2 was added. The solution was then cooled to 90° C. and an aqueous dispersion was produced by adding charge 3 and charge 4. The final dispersion had a solids content of 40% and a pH value of 6.7 and a particle size of 35 nm. The polyester had an average COOH functionality of ~1/chain.

Part B: The polyester polyol of part A was then formulated into a coating composition by mixing 80 weight % on resin solids of the polyester and 20 weight % on resin solids of Resimene® HM 2608 (melamine formaldehyde resin, available from ineos). The coating composition was drawn down over e-coated 4×12 panels, and cured for 30 min at 80° C.

The cured coating was tested for solvent resistance using MEK double rubs. MEK double rubs were evaluated using a modified method based on ASTM D 5402-06. Wypall brand 03086 wipes commercially available at Kimberly-Clark Professional Inc. were used for the testing. First, a mark having 8 inches by 1 inch area on the coated surface was tested. One piece of wipe was folded into a double thickness and saturated to a dripping wet condition with methyl ethyl ketone (MEK) solvent. Then an index finger was placed into center of the folded wipe and rubbed against the test area at a 45° angle. One forward and back motion was one double rub. The finger was repositioned on an unused portion of the folded wipe and the wipe was re-saturated every 25 double rubs, which was repeated until there is visible scratch/mar on the film. The more MEK double rubs indicates better cure response and solvent resistance.

The coating of the present invention exhibited superior solvent resistance with MEK double rubs of greater than 100.

Example 2

Preparation of a Polyester Prepolymer

A polyester prepolymer according to the present invention was prepared from the components listed in Table 2 in a four-neck round bottom flask equipped with an electronic temperature probe, mechanical stirrer, condenser, dry nitrogen sparge, and a heating mantle.

TABLE 2

| Component | Amount (grams) |
|---|---|
| PolyTHF ® 650[1] | 4316.7 |
| Trimellitic anhydride | 1701.3 |
| Diethylene glycol | 1174.6 |
| Butylstannoic acid | 3.02 |
| Triphenylphosphite | 3.60 |

The components were charged to the flask and the temperature was gradually increased to 170° C. over a two hour period while stirring, sparging with nitrogen, and collecting the distillate. The reaction temperature was held at 170° C. for 2.5 hours until the acid value dropped to 54 and 170 ml of distillate was collected. The final product was a light yellow liquid with a Gardner-Holdt viscosity of Z7+, a hydroxyl value of 129, a number average molecular weight ($M_N$) of 1914, a weight average molecular weight ($M_W$) of 6307, and a nonvolatile content of 95.0%.

Example 3

Preparation of a Polyester-Polyurethane Dispersion

A polyester-polyurethane dispersion was prepared from the component listed in Table 3 in a four-neck round bottom flask equipped with an electronic temperature probe, mechanical stirrer, condenser, and a heating mantle.

TABLE 3

| Component | Amount (grams) |
|---|---|
| Charge A | |
| Polyester prepolymer of Example 2 | 1339.7 |
| Polytetrahydrofuran, molecular weight 1000 | 584.9 |
| Hydroxyethyl methacrylate (HEMA) | 76.1 |
| Triphenylphosphite | 2.0 |
| Dibutyltin dilaurate | 1.0 |
| Butylated hydroxytoluene (Ionol) | 2.0 |

TABLE 3-continued

| Component | Amount (grams) |
|---|---|
| Charge B | |
| Butyl acrylate | 461.0 |
| Charge C | |
| Tetramethylxylylene diisocyanate (TMXDI) | 342.8 |
| Charge D | |
| Butyl acrylate | 45.6 |
| Charge E | |
| Water | 3038.3 |
| Dimethylethanolamine | 55.5 |
| Charge F | |
| Water | 1127.1 |
| 3-mercaptopropionic acid | 9.6 |
| PAM 200[3] | 96.2 |
| Dimethylethanolamine (DMEA) | 26.3 |
| Foamkill 649[4] | 1.0 |
| Charge G | |
| Butyl acrylate (BA) | 416.7 |
| Ethylene glycol dimethacrylate (EGDMA) | 288.5 |
| Charge H | |
| Water | 168.3 |
| t-Butyl hydroperoxide (70%) | 2.2 |
| Charge I | |
| Water | 407.1 |
| Ferrous ammonium sulfate | 0.064 |
| Sodium metabisulfite | 3.2 |
| Dimethylethanolamine | 1.5 |
| Charge J | |
| Water | 6.7 |
| PROXEL ® GXL[5] | 6.7 |

[3]Phosphate esters of acrylic PPG monomethacrylate, commercially available from Solvay.
[4]A defoamer, commercially available Crucible Chemical Co.
[5]A preservative, commercially available from Arch Chemicals.

Charge A was heated in the flask to 90° C. Charge B was added and the mixture was reheated to 90° C. Charge C was added over 60 minutes. Charge D was used to rinse the addition funnel used for Charge C. The reaction mixture was held at 90° C. for 2 hours. Charge E was heated in a separate 12 liter four-neck flask under a nitrogen atmosphere to 80° C. The 2406 g of the reaction product of charges A, B, C, and D was added to charge E over an 8 minute period. The reaction product had a number average molecular weight ($M_N$) of 3658 and a weight average molecular weight ($M_W$) of 20658. A nitrogen atmosphere was established and maintained in the flask for the remainder of the reaction. Charges F and G were added to the reaction flask and the reaction mixture was adjusted to 28° C. Charge H was added followed by a thirty minute addition of charge I. The temperature rose exothermically to 60° C. Charge J was added. The final dispersion of core-shells particles had a Brookfield viscosity of 174 centipoise (spindle #2, 60 RPM), an acid value of 10.7 (based on the final core-shell particles as a whole), a pH of 7.7, and a nonvolatile content of 39.8%.

Example 4

Preparation and Evaluation of Coatings

Various coatings were prepared from the components listed in Table 4, which included the polyester-polyurethane dispersion of Example 3 and a melamine resin with a certain mole percentage of methylol and imino functionality. The mixing ratio of the polyester-polyurethane dispersion with the melamine sample was 80/20 by weight based on total resin solids. Each mixture was drawdown using a drawdown bar and the dry film thickness was around 15 microns after cure at 80° C. for 30 minutes.

Solvent resistance of the coatings were then evaluated with MEK double rubs using a modified method based on ASTM D 5402-06. For the solvent resistance test, Wypall brand 03086 wipes commercially available at Kimberly-Clark Professional Inc. were used. First, a mark having 8 inches by 1 inch area on the coated surface was tested. One piece of wipe was folded into a double thickness and saturated to a dripping wet condition with methyl ethyl ketone (MEK) solvent. Then an index finger was placed into center of the folded wipe and rubbed against the test area at a 450 angle. One forward and back motion was one double rub. The finger was repositioned on an unused portion of the folded wipe and the wipe was re-saturated every 25 double rubs, which was repeated until there is visible scratch/mar on the film.

The more MEK double rubs indicates better cure response and solvent resistance. The results are shown in Table 4.

TABLE 4

| Coating Sample | Polyester polyurethane dispersion | Melamine resin Sample * | % NH + % CH$_2$OH of total functionality of the melamine (mole %) * | Solvent resistance (MEK double rubs) |
|---|---|---|---|---|
| 1 | Example 3 | A | 59.0 | 200+ |
| 2 | Example 3 | B | 56.8 | 200 |
| 3 | Example 3 | C | 42.8 | 30 |
| 4 | Example 3 | D | 42.3 | 30 |
| 5 | Example 3 | E | 28.6 | 10 |
| 6 | Example 3 | F | 20.5 | 1 |

* Melamine resin samples A-F contained different mole % levels of imino and methylol functional groups and which are further shown in Table 4. The mole % of the imino and methylol functional groups was determined based on the melamine functional group mole % method previously described herein.

As shown in Table 4, coating samples 1-4, which were prepared with a melamine resin having imino and methylol functional groups that together comprise 30 mole % or greater of the total functionality of the melamine resin, exhibited better solvent resistance as compared to coatings 5-6, which were prepared with a melamine resin having imino and methylol functional groups that together comprise less than 30 mole % of the total functionality of the melamine resin.

Comparative Example 5

Preparation and Evaluation of a Comparative Coating

Part A: A polyester diol was first prepared with the components listed in Table 5.

TABLE 5

| Component | Amount (g) |
|---|---|
| 1,6-Hexanediol | 1089 |
| Isophthalic acid | 269 |
| Butyl Stannoic acid | 1.3 |
| Triphenyl Phosphite | 1.3 |

The components were added to a four necked, 5 liter reaction flask outfitted with a stirrer, gas inlet, thermometer and condenser. The reaction mixture was heated to 220° C. in stages and held until the acid value was <5. A slow nitrogen stream helped remove the water condensate.

Part B: The components listed in Table 6 were then used to form the final polymer dispersion.

TABLE 6

| Component | Amount (grams) |
|---|---|
| Charge 1 | |
| Polyester diol of Part A | 1089 |
| Trimellitic anhydride | 269 |
| Charge 2 | |
| Dimethylethanolamine | 43.6 |
| DI Water | 392 |
| Charge 3 | |
| DI Water | 2640 |

The components of Charge I were added to a four necked, 5 liter reaction flask outfitted with a stirrer, gas inlet, thermometer and condenser. The reaction mixture was heated to 185° C. and held until the acid value was 28. A slow nitrogen stream helped remove the water condensate. As soon as an acid number of 28 was reached, the reaction was cooled to <100° C. When the reaction mixture was cooled to <100° C., an aqueous dispersion was produced by adding Charge 2 and Charge 3. The final dispersion had a solids content of 37% and a pH value of 7.8.

Part C: A coating composition was next prepared by mixing 80% on resin solids of the polyester from Part B with 20% on resin solids of Resimene® HM 2608. The composition was then drawn down over e-coated 4×12 panels and cured for 30 min at 80° C.

The cured coating was tested for solvent resistance using MEK double rubs with the method previously described. The coating, which did not use a polymer prepared with polytetrahydrofuran, exhibited poor solvent resistance with MEK double rubs of about 10.

Example 6

Preparation of a Basecoat Composition

A black basecoat composition according to the present invention was prepared from the components listed in Table 7.

TABLE 7

| Components | Parts by weight of Component |
|---|---|
| Polyester-polyurethane dispersion of Example 3 | 180.59 |
| BYK-348[6] | 0.23 |
| Surfynol ® 104E[7] | 5.04 |
| 50% DMEA[8] | 0.90 |
| Deionized Water | 13.80 |
| 2-ethylhexanol[9] | 5.00 |
| Dowanol™ PnB[10] | 3.01 |
| Butyl Cellosolve™[11] | 5.16 |
| Cymel ® 1158[12] | 27.03 |

TABLE 7-continued

| Components | Parts by weight of Component |
|---|---|
| Black Tint[13] | 32.54 |
| 50% DMEA[8] | 1.23 |
| DI Water | 28.45 |

[6]Silicone surfactant, commercially available from Byk Chemie.
[7]Surfactant, commercially available from Air Products and Chemicals, Inc.
[8]Dimethyl ethanolamine 50% aqueous solution.
[9]Solvent, commercially available from Shell Chemical Co.
[10]Propylene glycol n-butyl ether, commercially available from Dow Chemical Co.
[11]Ethylene glycol monobutyl ether, commercially available from Dow Chemical Co.
[12]Butylated melamine resin, commercially available from Allnex, and which has a total mole % of imino and methylol functional groups of 59 mole % as determined based on the melamine functional group mole % method previously described herein.
[13]Black Tint paste formed from 14% carbon black dispersed in 26% polyester polymer and having a solids content of 40%.

The components listed in Table 7 were added slowly into a stirring/mixing vessel during mixing. The final coating composition had a pH of 9.1, a coatings solids content of 35 weight % and a viscosity of 80 cp as measured by BYK CAP 2000+ Viscometer with Spindle #4 at a shear rate of 1000 s$^{-1}$ and 20° C.

Example 7

Preparation of a Top Coat

A topcoat composition was prepared from a two component polyol (Part A)-polyisocyanate (Part B) crosslinkable clearcoat based on 2K CERAMICLEAR® repair clearcoat (Commercially available from PPG Industries. Inc.). Part A was formed the polyol component of the 2K CERAMICLEAR®, and the composition of Part B was formed from the components listed in Table 8.

TABLE 8

| Desmodur N-3300A[14] (grams) | Desmodur N-3400[15] (grams) | n-amyl acetate (grams) | n-butyl acetate (grams) | Aromatic 100[16] (grams) | 10% dibutyl tin di-laurate in Xylene (grams) |
|---|---|---|---|---|---|
| 17.78 | 21.70 | 8 | 6 | 4 | 0.5 |

[14]Aliphatic polyisocyanate (HDI trimer), commercially available from Convestro.
[15]Aliphatic polyisocyanate (HDI uretdione), commercially available from Convestro.
[16]Solvent, commercially available from Shell Chemical Company.

The components in Table 8 were added slowly in a stirring/mixing vessel until a homogeneous solution was made at 20° C.

Example 8

Preparation and Evaluation of Multi-Layer Coatings

Multi-layer coatings were prepared by spraying the basecoat composition from Example 7 as first and second basecoat compositions over 4 inch by 12 inch steel panels that were pre-coated with an ED 6465 electrocoat (an electrocoat commercially available from PPG). The basecoat compositions were applied under controlled environmental conditions of 70-75° F. and 60-65% relative humidity. The first and second basecoat compositions were both applied in two coats, with a 90 second ambient flash between coats, and then flashed at ambient temperature for 4 minutes and dehydrated for 7 minutes at 70° C. The film thickness of the two layers of basecoats was 30-35 microns.

After forming the basecoat layers, the topcoat composition from Example 8 was made by mixing Part A and Part B, and then applied over the base coated panels in two coats with a 90 seconds ambient flash between coats. The mixing ratio of Part A to Part B was 2:1 by weight. The coated panels were allowed to flash for 10 minutes at ambient conditions and baked for 30 minutes at 80° C. The dry film thickness of the topcoats were 50-55 microns. The basecoats and clear topcoat were sprayed using Binks Model 95 spray gun with an automatization air pressure at 60 psi.

The distinctness of image (DOI) of the final films were then measured with BYK Wavescan instrument (manufactured by BYK Gardner USA of Columbia, Maryland). The humidity resistance of the final baked films was checked by putting the final baked panels in a 63° C. water bath for 2 days. DOI was measured before the humidity test and after being taken out of the water bath and recovered at room temperature for 24 hours. DOI loss % is defined as (DOI at 24 hours recovery—DOI before humidity)/DOI before humidity. The lower value of DOI loss %, the better humidity resistance of the multi-layer coating.

The multilayer coatings, which were cured at low temperatures of 80° C., exhibited superior humidity resistance with a DOI loss % of only 8%.

Example 9

Preparation of a Polyester-Acrylate Dispersion

A polyester-acrylate dispersion was prepared from the components listed in Table 9 in a four-neck round bottom flask equipped with an electronic temperature probe, mechanical stirrer, condenser, and a heating mantle.

TABLE 9

| Component | Amount (grams) |
| --- | --- |
| Charge A | |
| Polyester polyol of Example 1 Part A | 750 |
| DI water | 55 |
| Charge B | |
| Hydroxyproyplmethacrylate | 20 |
| Styrene | 40 |
| Butyl Acrylate | 40 |
| Charge C | |
| Isoascorbic acid | 0.31 |
| Dimethylethanolamine | 0.47 |
| DI Water | 20 |
| Charge D | |
| Ferrous Ammonium Sulfate | 0.002 |
| DI Water | 10 |
| Charge E | |
| Hydrogen Peroxide (35%) | 1.4 |
| DI Water | 40 |
| Charge F | |
| Dimethylethanolamine | 3.9 |
| DI Water | 10 |

Charge A was first applied to the flask. While the reaction was heating to 35° C., vacuum was applied to remove the dissolved oxygen. Upon reaching 35° C., the vacuum was broken with a nitrogen stream and the reaction was continued under nitrogen atmosphere. Charge B was added followed by stirring for 5 minutes, then Charged C and D were added followed by stirring for 5 minutes. Charge E was then added all at once and within 2 minutes an exotherm ensued. The reaction temperature reached 51° C. within 10 minutes. The reaction was then heated to 65° C. and held for 30 minutes to ensure complete monomer conversion. The reaction was then cooled to 35° C. and Charge F was added. A fine particle size dispersion with a solids content of 40% and pH of 7.6 was obtained. A 5 wt. % solution of the resulting polyester—acrylate dispersion in tetrahydrofuran showed slight turbidity indicating the presence of crosslinked material.

Example 10

Preparation of a White Coating Composition

A white coating composition according to the present invention was first prepared from the components listed in Table 10.

TABLE 10

| Component | Amount (grams) |
| --- | --- |
| Polyester-acrylate dispersion of Example 10 | 89.05 |
| DI Water | 23.15 |
| Dowanol ® PM[17] | 5.00 |
| Resimene ® HM 2608[18] | 13.89 |
| BYK-011[19] | 0.34 |
| TIONA 595[20] | 65.00 |

[17]Glycol ether solvent, commercially available from Dow.
[18]Melamine formaldehyde resin, available from INEOS.
[19]Defoamer, commercially available from BYK.
[20]Titanium dioxide pigment, commercially available from Cristal.

The components listed in Table 10 were combined under mixing for 10 minutes with a mixing blade and then ground for 4 hours on Lau Disperser to 7.5+ Hegman grind following ASTM D1210-05.

Examples 11 and 12

Evaluation of coatings

The coating composition prepared in Example 10 as well as various comparative coating compositions were drawn down over untreated aluminum panels using a wire wound rod to obtain a dry coating film thickness of approximately 12 microns. The coated panels were immediately placed into an electric box oven for 5 minutes at various oven temperatures of 100° C., 120° C., 140° C., and 160° C.

The cured coatings were evaluated for MEK double rubs, cross-hatch adhesion, wedge bend, and hot water adhesion.

MEK double rubs were evaluated following the modified method based on ASTM D 5402-06 previously described but in which a gauze covered hammer saturated with methyl ethyl ketone was used. Further, the coatings were evaluated for cure by the number of double rubs it took to soften and break through the coating or to reach 100 double rubs.

Cross-hatch adhesion was performed according to ASTM D 3359-17 Test Method B, using Scotch 610 tape, available from 3M Company of Saint Paul, Minn. Adhesion was rated on a scale of 0 to 5 where a rating of "5" indicates no adhesion failure.

The wedge bend test involves bending a coated test specimen over a 3 mm mandrel to form a test wedge. The test wedge is then impacted along the deformation axis with a 2.4 kg weight dropped from a height of 60 cm. The millimeters of coating failure along the deformation axis of the test wedge was then reported.

The hot water adhesion test is designed to measure the resistance of a coating to 70° C. hot water. Coated strips were immersed into 70° C. deionized water for 15 minutes. The strips were then rinsed and cooled in deionized water, dried, and immediately rated for adhesion as described previously.

The results of the testing are described in Table 11.

TABLE 11

| | Bake time & temperature | MEK Double Rubs | Cross-batch Adhesion | Wedge Bend Test (% Failure) | Hot Water Adhesion |
|---|---|---|---|---|---|
| Example 11 | 5 minutes @ 140° C. | 100 | 5B | 39 | 5B |
| Example 11 | 5 minutes @ 120° C. | 100 | 5B | 31 | 5B |
| Example 11 | 5 minutes @ 100° C. | 30 | 5B | 23 | 1B |
| Comparative Example 12[21] | 5 minutes @ 160° C. | 100 | 5B | 44 | 5B |
| Comparative Example 12[21] | 5 minutes @ 140° C. | 50 | 5B | 87 | 5B |
| Comparative Example 12[21] | 5 minutes @ 120° C. | 5 | N/A | N/A | N/A |

[21]The coating of Comparative Example 13 was prepared from HOBA white basecoat (PPG 4638-002), commercially available from PPG.

As shown in Table 11, the coatings of Example 11 exhibited excellent properties at 140° C. and 120° C. bake temperatures and good properties at 100° C. In contrast, the coatings of Comparative Example 12 only exhibited excellent properties at a higher bake temperature of 160° C. It is appreciated that the coatings were applied over untreated aluminum panels, which illustrates the coatings performance over aluminum material typically used for monobloc cans such as monobloc aerosol cans.

The present invention is also directed to the following clauses.

Clause 1: A coating composition comprising: (a) a melamine resin comprising imino and methylol functional groups that together comprise 30 mole % or greater of the total functionality of the melamine resin; and (b) at least one polymer reactive with (a) that is obtained from components comprising polytetrahydrofuran and a carboxylic acid or anhydride, wherein the polytetrahydrofuran comprises greater than 20 weight % of the components that form the polymer (b) and the carboxylic acid or anhydride comprises greater than 5 weight % of the components that form the polymer (b), and wherein the polymer (b) has an acid value of at least 15 based on the total resin solids of the polymer (b).

Clause 2: The coating composition of clause 1, wherein the carboxylic acid or anhydride thereof comprises at least one aromatic ring, and wherein the carboxylic acid or anhydride functional groups are bonded directly to the aromatic ring.

Clause 3: The coating composition of clauses 1 or 2, wherein the carboxylic acid or anhydride thereof comprises trimellitic anhydride.

Clause 4: The coating composition of any one of clauses 1-3, wherein the polymer (b) reactive with the melamine resin (a) comprises polymeric core-shell particles, wherein at least a portion of a polymeric shell of the core-shell particles is covalently bonded to at least a portion of a polymeric core of the core-shell particles, and wherein the polymeric shell of the core-shell particles is obtained from components comprising the polytetrahydrofuran and the carboxylic acid or anhydride thereof and in which the polymeric shell has an acid value of at least 15 based on the total resin solids of the polymer that forms the polymer shell.

Clause 5: The coating composition of clause 4, wherein the polymeric shell of the core-shell particles comprises ether linkages and ester linkages, urethane linkages, or a combination thereof.

Clause 6: The coating composition of any one of clauses 4-5, wherein the polymeric shell of the core-shell particles comprises carboxylic acid functional groups and hydroxyl functional groups.

Clause 7: The coating composition of any one of clauses 4-6, wherein the polymeric core of the core-shell particles comprises an addition polymer derived from ethylenically unsaturated monomers.

Clause 8: The coating composition of any one of clauses 1-3, wherein the polymer (b) reactive with the melamine resin (a) comprises a self-emulsifying dispersion polymer.

Clause 9: The coating composition of clause 8, wherein the polytetrahydrofuran comprises greater than 40 weight % of the components that form the self-emulsifying dispersion polymer.

Clause 10: The coating composition of clauses 8 or 9, wherein the self-emulsifying dispersion polymer comprises ether linkages and ester linkages, urethane linkages, or a combination thereof.

Clause 11: The coating composition of anyone of clauses 1-10, wherein the polymer (b) reactive with the melamine resin (a) comprises both: (i) polymeric core-shell particles in which at least a portion of a polymeric shell of the core-shell particles is covalently bonded to at least a portion of a polymeric core of the core-shell particles, and wherein the polymeric shell of the core-shell particles is obtained from components comprising the polytetrahydrofuran and the carboxylic acid or anhydride thereof and in which the polymeric shell has an acid value of at least 15 based on the total resin solids of the polymer that forms the polymer shell; and (ii) a self-emulsifying dispersion polymer.

Clause 12: The coating composition of any one of clauses 1-11, wherein (a) the melamine resin comprises from 5 weight % to 40 weight % of the coating composition, based on the total resin solids of the coating composition.

Clause 13: The coating composition of anyone of clauses 1-12, wherein the polymer (b) reactive with the melamine resin (a) comprises from 50 weight % to 90 weight % of the total resin solids of the coating composition.

Clause 14: A substrate at least partially coated with a coating formed from the coating composition of any one of clauses 1-13.

Clause 15: The substrate of clause 14, wherein the substrate forms at least a portion of a vehicle.

Clause 16: The substrate of clause 14, wherein the substrate forms at least a portion of a package.

Clause 17: The substrate of clause 16, wherein the package comprises a metal can, an aerosol can or tube, or a monobloc aerosol can or tube.

Clause 18: A multi-layer coating system comprising: (1) a first basecoat layer applied over at least a portion of a substrate; and (2) a second basecoat layer applied over at least a portion of the first coating layer, wherein at least one of the first basecoat layer and the second basecoat layer is formed from a first basecoat composition as defined in any one of clauses 1-13.

Clause 19: The multi-layer coating system of clause 18, wherein the first basecoat layer is formed from the first basecoat composition.

Clause 20: The multi-layer coating system of clause 18, wherein the second basecoat layer is formed from the first basecoat composition.

Clause 21: The multi-layer coating system of any one of clauses 18-20, further comprising a primer coating layer applied over at least a portion of the substrate, wherein the first primer coating layer is positioned between the first basecoat layer and the substrate.

Clause 22: The multi-layer coating system of any one of clauses 18-21, further comprising a topcoat layer applied over at least a portion of the second basecoat layer.

Clause 23: A process of coating a substrate with a multi-layer coating comprising: forming a first basecoat layer over at least a portion of a substrate by depositing a first basecoat composition onto at least a portion of the substrate; and forming a second basecoat layer over at least a portion of the first basecoat layer by depositing a second basecoat composition directly onto at least a portion of (1) the first basecoat layer after the first basecoat composition is dehydrated or (2) the first basecoat composition before the first basecoat composition is dehydrated, wherein the first basecoat composition and second basecoat composition are dehydrated at a temperature within a range of from ambient temperature to 90° C. for two minutes or less, and wherein at least one of the first basecoat layer and the second basecoat layer is formed from a first basecoat composition comprising as defined in any one of the clauses 1-14.

Clause 24: The process of clause 23, wherein the first basecoat composition is dehydrated before application of the second basecoat composition.

Clause 25: The process of clause 23, wherein both the first and second basecoat compositions are simultaneously dehydrated.

Clause 26: The process of any one of clauses 23-25, w wherein, after dehydration, the first and second basecoats together comprise a solids content of at least 80 weight %, based on the total weight of the first and second basecoats.

Clause 27: The process of any one of clauses 23-26, further comprising curing the first and second basecoat compositions at a temperature of 120° C., or less.

Clause 28: The process of any one of clauses 23-26, further comprising applying a topcoat composition over at least a portion of the second basecoat composition and curing the first and second coating compositions and the topcoat composition simultaneously at a temperature of 120° C., or less.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition comprising:
  (a) a melamine resin comprising imino and methylol functional groups that together comprise 30 mole % or greater of the total functionality of the melamine resin; and
  (b) at least one polymer reactive with (a) that is obtained from components comprising polytetrahydrofuran and a carboxylic acid or anhydride thereof, and that comprises polymeric core-shell particles, wherein at least a portion of a polymeric shell of the core-shell particles is covalently bonded to at least a portion of a polymeric core of the core-shell particles, and wherein the polymeric shell of the core-shell particles is obtained from components comprising the polytetrahydrofuran and the carboxylic acid or anhydride thereof and in which the polymeric shell has an acid value of at least 15 based on the total resin solids of the polymer that forms the polymeric shell;
  wherein the polytetrahydrofuran comprises greater than 20 weight % of the components that form the polymer (b) and the carboxylic acid or anhydride thereof comprises greater than 5 weight % of the components that form the polymer (b), and
  wherein the polymer (b) has an acid value of at least 15 based on the total resin solids of the polymer (b), and wherein acid functionality of the polymer (b) has a pKa less than 5.

2. The coating composition of claim 1, wherein the carboxylic acid or anhydride thereof comprises at least one aromatic ring, and wherein the carboxylic acid or anhydride functional groups are bonded directly to the aromatic ring.

3. The coating composition of claim 1, wherein the carboxylic acid or anhydride thereof comprises trimellitic anhydride.

4. The coating composition of claim 1, wherein the polymeric shell of the core-shell particles comprises carboxylic acid functional groups and hydroxyl functional groups and/or an additional polymer derived from ethylenically unsaturated monomers.

5. The coating composition of claim 1, wherein the polymer (b) reactive with the melamine resin (a) comprises a self-emulsifying dispersion polymer.

6. The coating composition of claim 5, wherein the polytetrahydrofuran comprises greater than 40 weight % of the components that form the self-emulsifying dispersion polymer.

7. The coating composition of claim 1, wherein the polymer (b) reactive with the melamine resin (a) further comprises a self-emulsifying dispersion polymer.

8. The coating composition of claim 1, wherein (a) the melamine resin comprises from 5 weight % to 40 weight % of the coating composition, based on the total resin solids of the coating composition.

9. The coating composition of claim 1, wherein the polymer (b) reactive with the melamine resin (a) comprises from 50 weight % to 90 weight % of the total resin solids of the coating composition.

10. A substrate at least partially coated with a coating formed from the coating composition of claim 1.

11. The substrate of claim 10, wherein the substrate forms at least a portion of a vehicle or a package.

12. The substrate of claim 11, wherein the package comprises a metal can, an aerosol can or tube, or a monobloc aerosol can or tube.

13. A multi-layer coating system comprising:
  (1) a first basecoat layer applied over at least a portion of a substrate; and
  (2) a second basecoat layer applied over at least a portion of the first coating layer,
  wherein at least one of the first basecoat layer and the second basecoat layer is formed from a first basecoat composition comprising:
    (a) a melamine resin comprising imino and methylol functional groups that together comprise 30 mole % or greater of the total functionality of the melamine resin; and
    (b) at least one polymer reactive with (a) that is obtained from components comprising polytetrahydrofuran and a carboxylic acid or anhydride thereof, and that comprises polymeric core-shell particles, wherein at least a portion of a polymeric shell of the core-shell particles is covalently bonded to at least a portion of a polymeric core of the core-shell particles, and wherein the polymeric shell of the core-shell particles is obtained from components comprising the polytetrahydrofuran and the carboxylic acid or anhydride thereof and in which the polymeric shell has an acid value of at least 15 based on the total resin solids of the polymer that forms the polymeric shell;

wherein the polytetrahydrofuran comprises greater than 20 weight % of the components that form the polymer (b) and the carboxylic acid or anhydride thereof comprises greater than 5 weight % of the components that form the polymer (b), and wherein the polymer (b) has an acid value of at least 15 based on the total resin solids of the polymer (b), and wherein acid functionality of the polymer (b) has a pKa less than 5.

14. The multi-layer coating system of claim 13, further comprising a primer coating layer applied over at least a portion of the substrate, wherein the first primer coating layer is positioned between the first basecoat layer and the substrate.

15. The multi-layer coating system of claim 13, wherein the polymer (b) reactive with (a) comprises a self-emulsifying dispersion polymer.

16. A process of coating a substrate with a multi-layer coating comprising:
forming a first basecoat layer over at least a portion of a substrate by depositing a first basecoat composition onto at least a portion of the substrate; and
forming a second basecoat layer over at least a portion of the first basecoat layer by depositing a second basecoat composition directly onto at least a portion of (1) the first basecoat layer after the first basecoat composition is dehydrated or (2) the first basecoat composition before the first basecoat composition is dehydrated,
wherein the first basecoat composition and second basecoat composition are dehydrated at a temperature within a range of from ambient temperature to 90° C. for two minutes or less, and wherein at least one of the first basecoat layer and the second basecoat layer is formed from a first basecoat composition comprising:
(a) a melamine resin comprising imino and methylol functional groups that together comprise 30 mole % or greater of the total functionality of the melamine resin; and
(b) at least one polymer reactive with (a) that is obtained from components comprising polytetrahydrofuran and a carboxylic acid or anhydride thereof, and that comprises polymeric core-shell particles, wherein at least a portion of a polymeric shell of the core-shell particles is covalently bonded to at least a portion of a polymeric core of the core-shell particles, and wherein the polymeric shell of the core-shell particles is obtained from components comprising the polytetrahydrofuran and the carboxylic acid or anhydride thereof and in which the polymeric shell has an acid value of at least 15 based on the total resin solids of the polymer that forms the polymeric shell;

wherein the polytetrahydrofuran comprises greater than 20 weight % of the components that form the polymer (b) and the carboxylic acid or anhydride thereof comprises greater than 5 weight % of the components that form the polymer (b), and wherein the polymer (b) has an acid value of at least 15 based on the total resin solids of the polymer (b, and wherein acid functionality of the polymer (b) has a pKa less than 5.

17. The process of claim 16, wherein the first basecoat composition is dehydrated before application of the second basecoat composition or both the first and second basecoat compositions are simultaneously dehydrated.

18. The process of claim 16, further comprising curing the first and second basecoats at a temperature of 120° C., or less.

* * * * *